United States Patent [19]

Otsu et al.

[11] Patent Number: 5,835,233

[45] Date of Patent: Nov. 10, 1998

[54] PICTURE FORMING APPARATUS

[75] Inventors: Kazunori Otsu; Takashi Kitada, both of Kasuga; Hiroyuki Yamada, Fukuoka; Muneo Unoki, Shime-machi; Koichiro Tsuruno, Fukuoka, all of Japan

[73] Assignee: Matsushita Electric Industrial Co., Ltc., Osaka, Japan

[21] Appl. No.: 854,112

[22] Filed: May 9, 1997

Related U.S. Application Data

[63] Continuation of Ser. No. 319,232, Oct. 6, 1994, abandoned.

[30] Foreign Application Priority Data

Oct. 6, 1993 [JP] Japan .................................. 5-250393

[51] Int. Cl.$^6$ ...................................................... H04N 1/407
[52] U.S. Cl. ........................... 358/298; 358/300; 358/459; 347/131
[58] Field of Search ...................................... 358/296, 298, 358/455, 456, 458, 459, 462, 464; 382/254, 257, 258; 395/101, 109; 347/131

[56] References Cited

U.S. PATENT DOCUMENTS

| | | | |
|---|---|---|---|
| 4,312,005 | 1/1982 | Iwasaki | 347/15 |
| 5,029,108 | 7/1991 | Lung | 364/519 |
| 5,208,605 | 5/1993 | Drake | 347/15 |
| 5,379,130 | 1/1995 | Wang et al. | 358/462 |
| 5,392,061 | 2/1995 | Vondran, Jr. | 358/296 |
| 5,416,855 | 5/1995 | Geiger | 358/447 |
| 5,438,437 | 8/1995 | Mizoguchi et al. | 347/118 |
| 5,475,476 | 12/1995 | Murai et al. | 355/246 |
| 5,483,625 | 1/1996 | Robertson et al. | 395/117 |
| 5,706,414 | 1/1998 | Pritchard | 395/101 |
| 5,729,270 | 3/1998 | Wright et al. | 347/131 |

Primary Examiner—Peter S. Wong
Assistant Examiner—Derek J. Jardieu
Attorney, Agent, or Firm—Ratner & Prestia

[57] ABSTRACT

A picture forming apparatus comprises a memory means for storing an inputted picture data, a picture data changing means for changing a stored data into a new picture data in order to save a recording material, and a picture printing means. The picture data changing means changes the stored picture data into a new picture data in order to save a recording material only when a saving command of a recording material is given. The new picture data includes smaller dots than the stored picture data and/or has a fewer picture dots than the stored picture dots. As a result, the new picture data enables the picture printing means to save a recording material.

8 Claims, 13 Drawing Sheets

PICTURE FORMING APPARATUS

This application is a continuation of application Ser. No. 08/319,232 filed Oct. 6, 1994 now abandoned.

BACKGROUND OF THE INVENTION

1. Field of the invention

The present invention relates to a picture forming apparatus such as a LASER beam printer and a digital copying machine.

DESCRIPTION OF THE PRIOR ART

Figure 13:
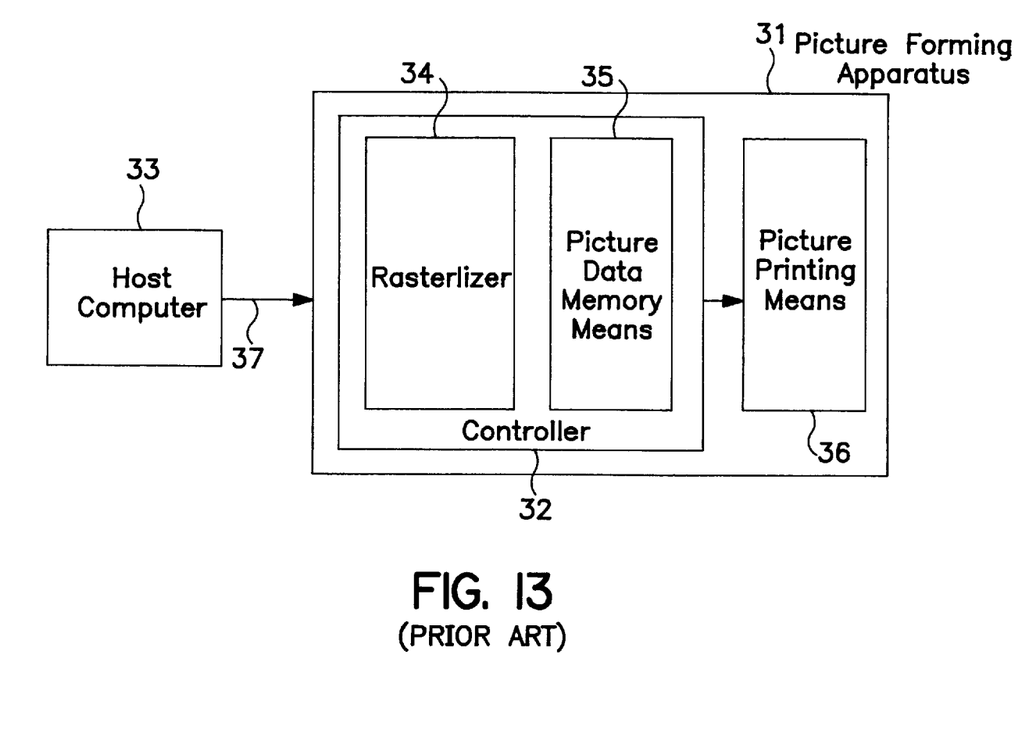
FIG. 13 is a block diagram of a conventional type of picture forming apparatus.

A picture forming apparatus which uses an electrophotography such as a LASER beam printer and a digital copying machine is widely used. In these days, in order to recycle copying papers, it is desired to consume less recording materials such as toner or ink. For the better understanding, this specification describes a case using toner. FIG. 13 illustrates a conventional type of picture forming apparatus wherein picture data is sent to a picture forming apparatus 31 from a host computer 33 via a cable 37. The picture data is transformed to a binary data, 0 or 1, by a rasterlizer 34, in a controller 32, and then stored in a picture data memory means 35. After being stored, the picture data is sent to a picture printing means 36 thereby the picture is printed. In order to save toner, bias voltage is lowered for reducing the amount of toner adhered to a copying paper. However this method is so much influenced by environmental conditions such as temperature and humidity that it lowers picture quality. In addition, such unstable process often accompanies back ground soil which aggravates the picture quality, and at the same time, increases toner consumption.

The present invention overcomes these drawbacks and provides a picture forming apparatus which can print a high quality picture through a stable process as well as save toner.

SUMMARY OF THE INVENTION

The picture forming apparatus of the present invention comprises:

1. a memory means for storing an inputted picture data,
2. a picture-data changing means for changing the stored picture data into a new picture-data which can save toner in printing, and
3. a picture printing means for printing a picture.

When a toner-saving-command is given, the picture data changing means changes the stored picture data into a new picture data which enables the apparatus to save toner in printing.

The new picture data includes smaller picture-dots than the stored picture data and/or has a fewer dots than the stored picture data. As a result, the new picture data enables the apparatus to save toner in printing. Further, since bias voltage of the toner is not lowered, the apparatus according to the present invention can print a high quality image through a stable process.

DESCRIPTION OF THE PREFERRED EMBODIMENT

As mentioned above, in order to make the story simple, the following embodiments explain the saving of toner, however, other recording materials such as ink can be applicable to these embodiments.

(1st Embodiment)

Figure 1:
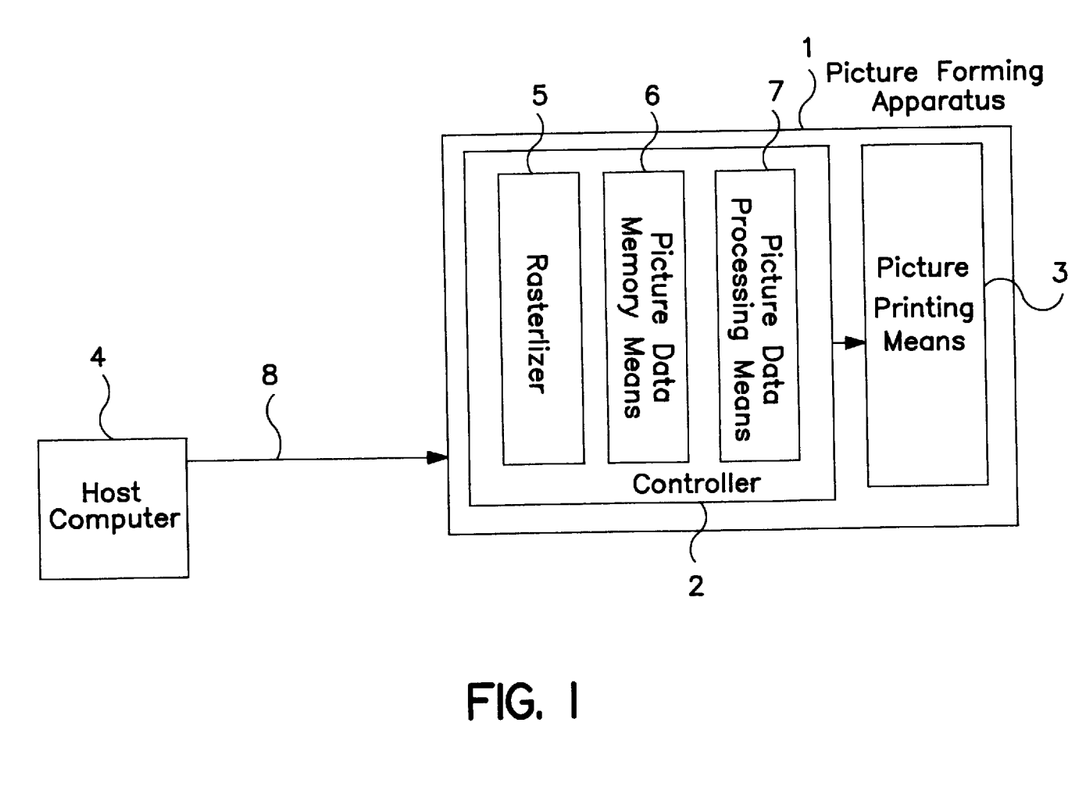
FIG. 1 is a block diagram of a picture forming apparatus in accordance with an exemplary embodiment of the present invention.

FIG. 1 illustrates a first preferred embodiment. Included is a printer code sent to a picture forming apparatus 1 via a cable 8. The printer code is transformed into a binary data, 1 or 0, at a rasterlizer in a controller 2 before being stored in a picture data memory means 6. An output of the picture data memory means 6 is sent via a picture data processing means 7 to a picture printing means 3 wherein a picture is printed.

Figure 2:
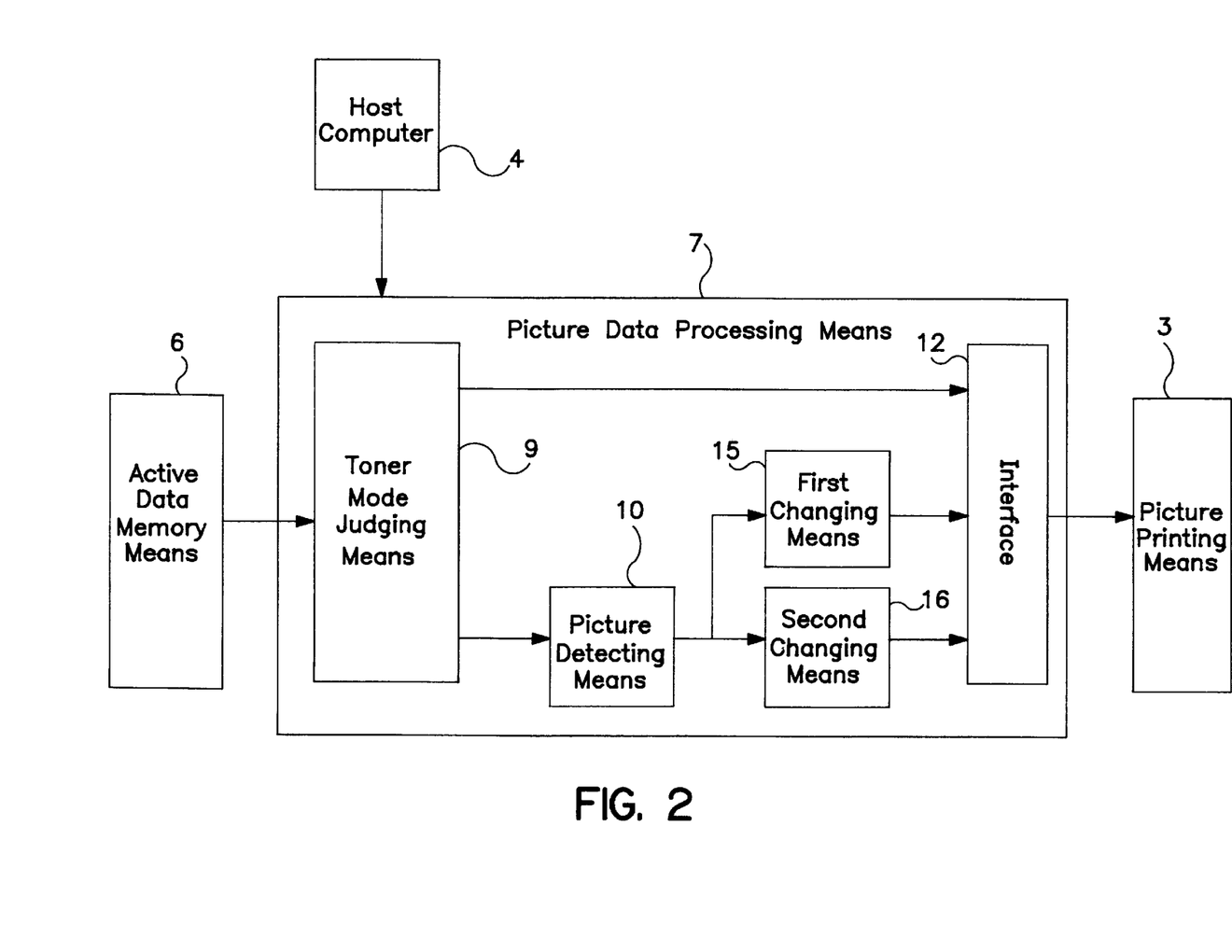
FIG. 2 is a block diagram in accordance with first and second exemplary embodiments of the present invention.
Figure 3A:
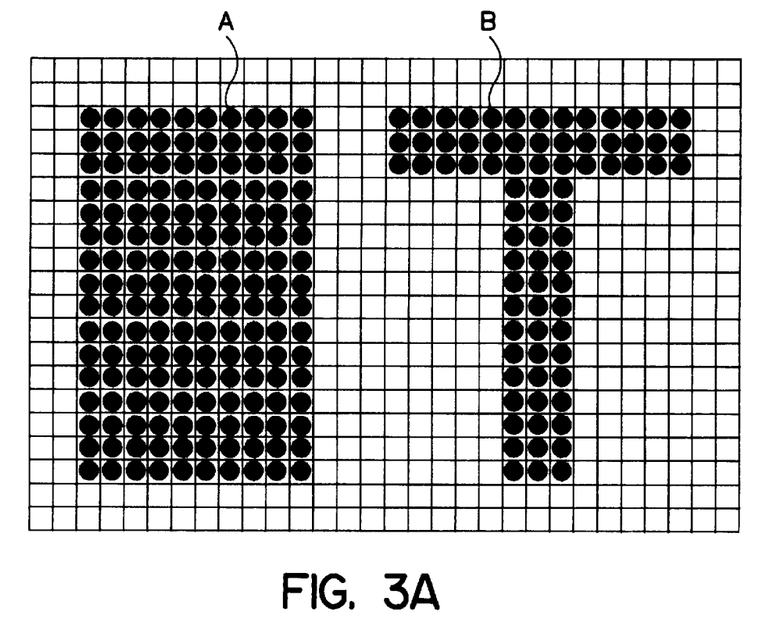
FIGS. 3(a) and (b) illustrate the printing of a picture in accordance with the first exemplary embodiment of the present invention.

As shown in FIG. 2, the picture data processing means 7 includes a toner mode judging means which judges effectiveness of a toner saving command. The toner saving command is included in the print code sent from a host computer 4, and it can be also inputted from keys, not shown, of the picture forming apparatus. In a regular mode wherein the toner saving mode does not work, a picture data supplied from the picture data memory means 6 is sent without being changed via an interface 12 to the picture printing means 3. FIG. 3(a) shows a picture of a regular mode, wherein all dots composing pictures A and B are regular sizes. In an actual case, each picture dot of a picture data is not always corresponding to a counterpart of a picture. One picture dot of a picture data may be printed with a plurality of dots. To make a story simple, all embodiments in this specification handle the cases wherein each picture dot of a picture data corresponds to each picture dot of a picture.

In a toner saving mode wherein the toner saving command works, a picture data is transformed to a toner saving picture data by a picture detecting means 10, a first changing means 15 and a second changing means 16, and then is sent to the picture printing means 3. The picture detecting means 10 groups the picture data into picture data on edge portion and that surrounded by edge, hereinafter called "picture data of internal portion," and then send the picture data on edge portion to a first changing means as well as send the picture data of internal portion to a second changing means 16.

Figure 3B:
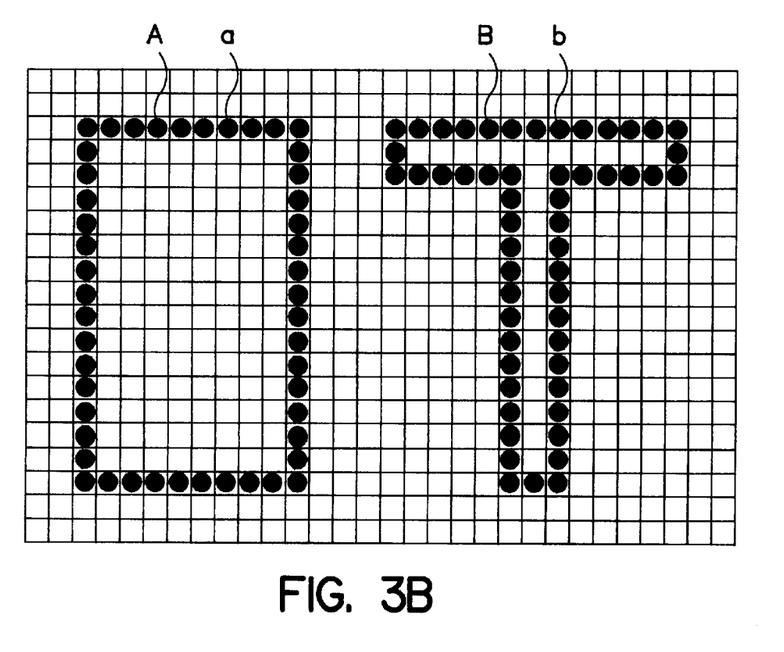
Figure 4:
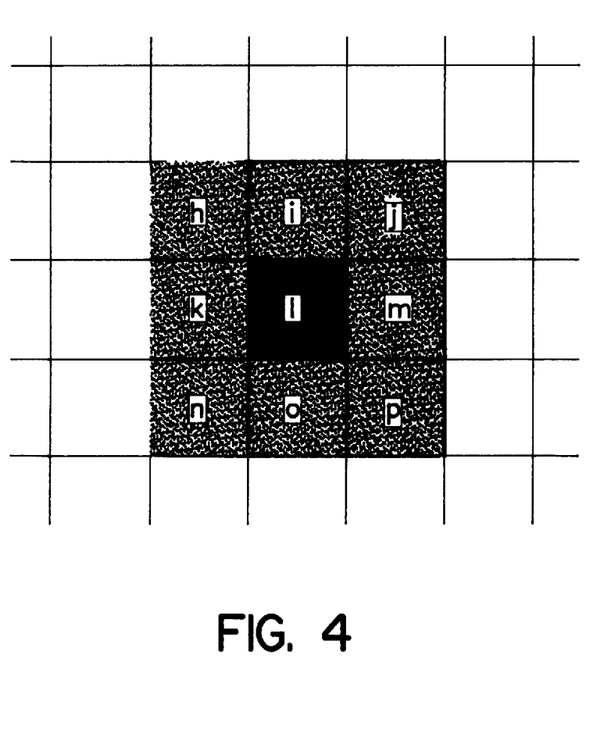
FIG. 4 illustrates the detection of picture dots at an edge of an object.

In this embodiment, the first changing means 15 which is supposed to change the picture data on edge portion sends the picture data on edge portion without any change to the picture printing means 3. The second changing means 16 which changes the picture data of internal portion forms a picture data for saving toner by transforming the picture data of internal portion into 0 as shown in FIG. 3 (b). The edge portion picture dots a and b of the dots composing the pictures A and B are printed in regular sizes, while dots of the picture data of internal portion are not printed, and thereby toner is less consumed. The printed picture has distinct outline, and the patterns of picture A and B are well distinguished. In addition, since a bias voltage on toner is not lowered, the apparatus provides no back ground soil through a stable printing process. As a result, a quality printing is obtained. FIG. 4 illustrates how the picture detecting means 10 groups picture data into picture data on edge portion and that of internal portion: "i", "k", "m" and "o" are adjacent dots to a picture dot "1" which is an objective of detecting. When a logical multiplication of "1", "i". "k", "m" and "o" is 0 and "1"=1, the picture dot "1" belongs to the picture dots on edge portion. When the logical multiplication is 1, then the picture dot "1" belongs to the picture dots of internal portion.

(2nd Embodiment)

Figure 5A:
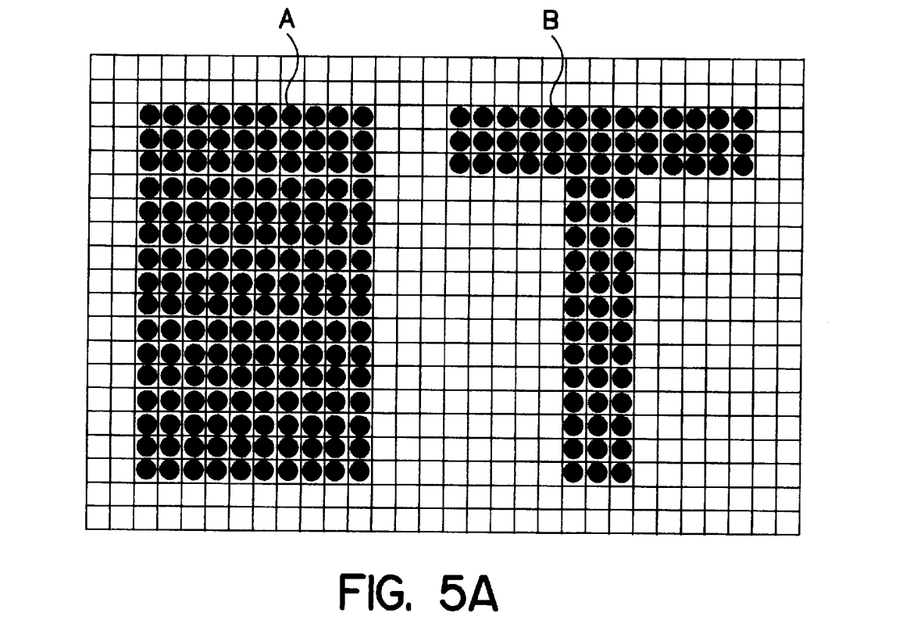
FIGS. 5(a) and (b) illustrate the printing of a picture in accordance with the second exemplary embodiment of the present invention.

FIG. 2 also illustrates a 2nd embodiment. In the regular mode wherein the toner saving command does not work, a picture data supplied from the picture data memory means 6 is sent without any change to the picture printing means 3. FIG. 5 (a) shows a picture of the regular mode, wherein all dots composing pictures A and B are of regular sizes.

Figure 5B:
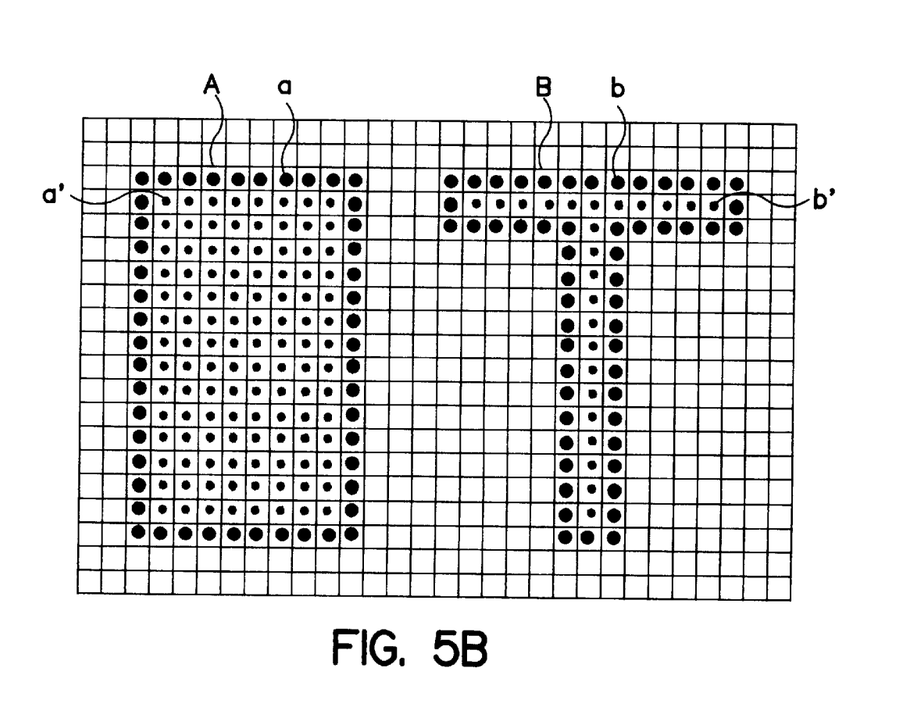

In a toner saving mode wherein the toner saving command works, a picture data is transformed to a toner saving picture data by a picture detecting means 10, the first changing means 15 and the second changing means 16, and then is sent to the picture printing means 3. The picture detecting means 10 groups the picture data into picture data on edge portion and that of internal portion, and then, the first changing means 15 changes the picture data on edge portion while the second changing means 16 changes the picture data of internal portion in order to form a toner saving picture data. FIG. 5 (b) shows a picture of a toner saving mode. The edge portion dots a and b some of the dots comprising pictures A and B are printed in ⅔ size of regular sizes, while internal portion dots a' and b' are printed in ⅓ size of regular size. Toner is thus less consumed. Picture dots of outlines are printed in bigger sizes than that of inner dots, and the inner space is filled with smaller dots. The outlines as well as patterns of pictures A and B are thus well distinguished. In addition, since a bias voltage on toner is not lowered, a picture can be printed by a stable process. As a result, a quality printing is achieved.

(3rd Embodiment)

Figure 6:
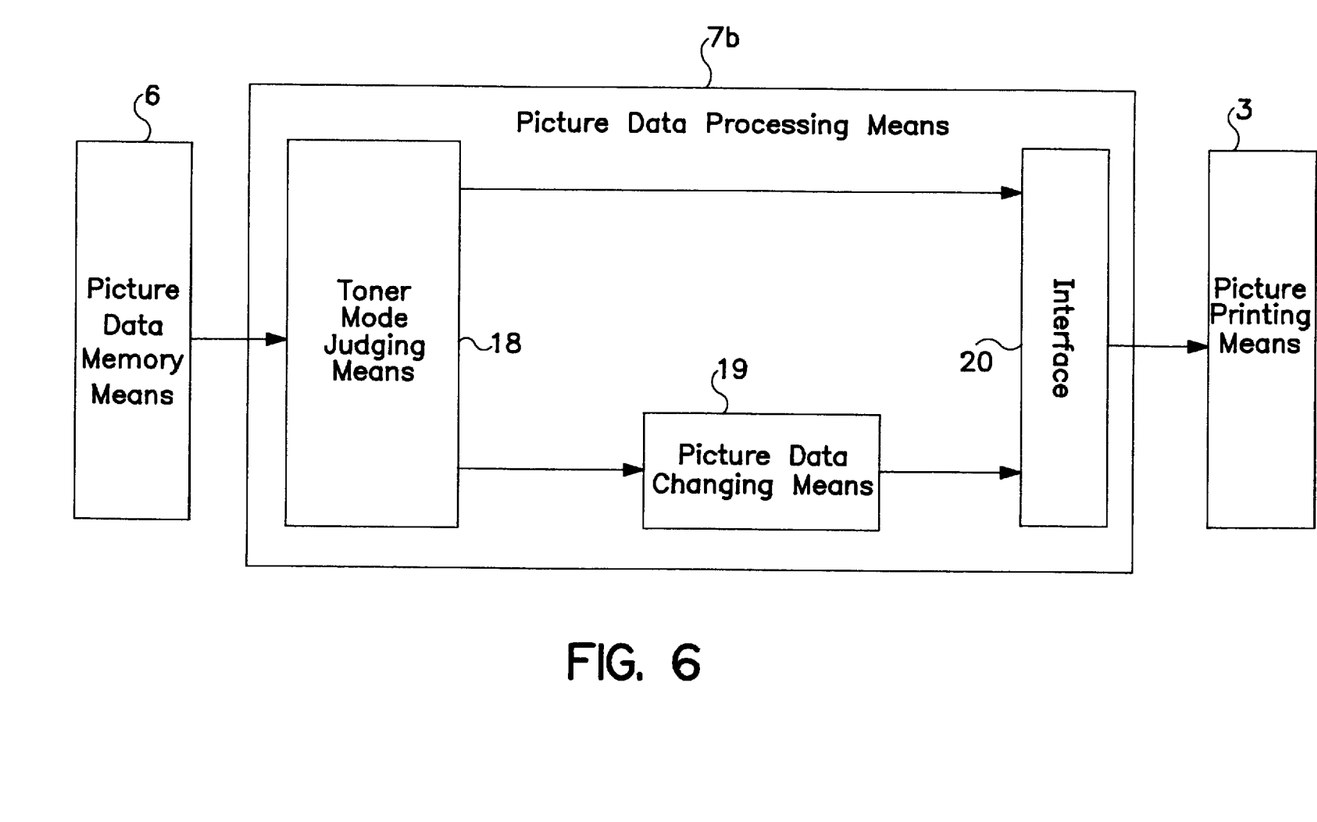
FIG. 6 is a block diagram in accordance with the third exemplary embodiment of the present invention.
Figure 7A:
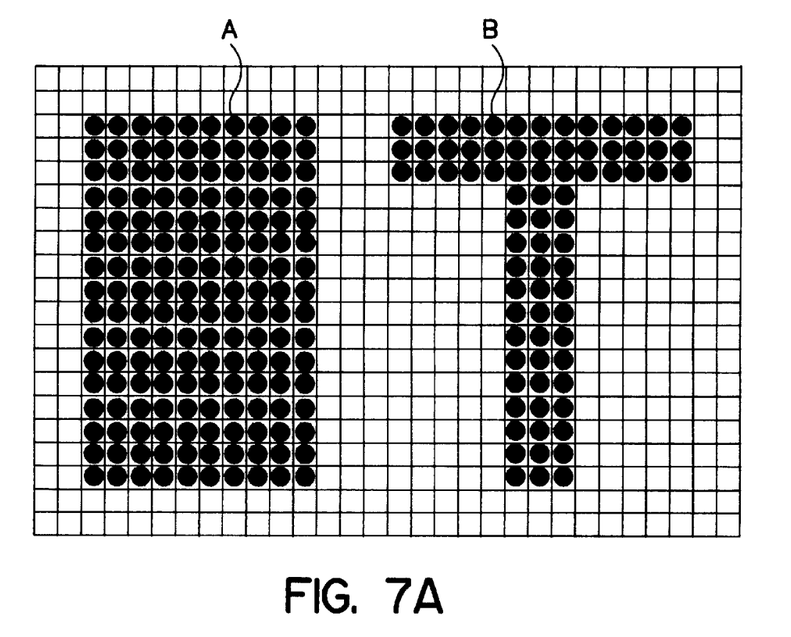
FIGS. 7(a) and (b) illustrate the printing of a picture in accordance with the third exemplary embodiment of the present invention.
Figure 7B:
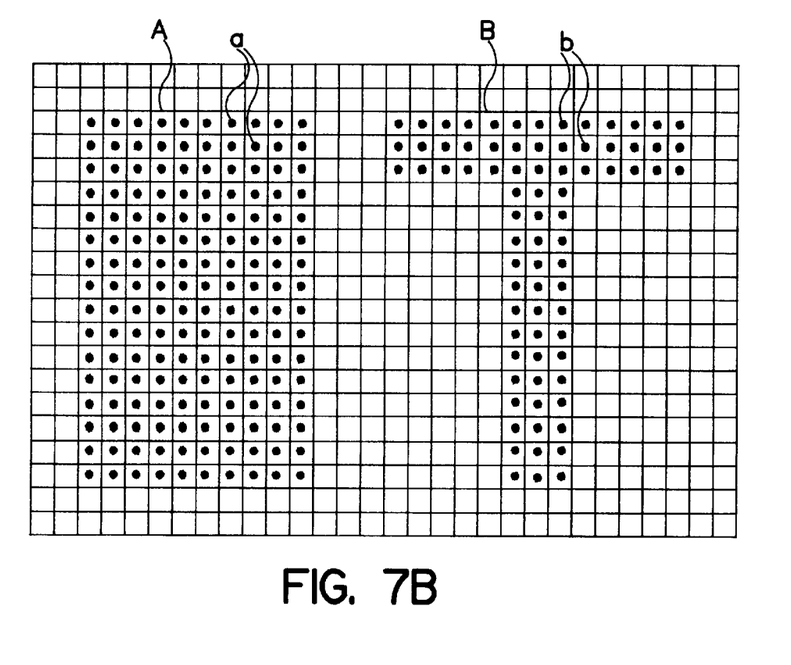

A 3rd embodiment is same as the first embodiment except a picture data process means 7b shown in FIG. 6: In the regular mode wherein the toner saving command does not work, a picture data supplied from the picture data memory means 6 is sent without any change to the picture printing means 3, this is the same process as the first embodiment. An interface is numbered 20. FIG. 7 (a) shows a picture in the regular mode. All the dots composing the pictures A and B are of regular sizes. In the toner saving mode wherein the toner saving command works, a picture data is changed into a toner saving picture data by the picture data changing means 19, and then sent to the picture printing means 3. FIG. 7 (b) shows a picture of the toner saving mode. All the dots composing pictures A and B are printed in ⅓ of regular sizes. Toner consumption is thus more saved than the 2nd embodiment. Since a bias voltage on toner is not lowered, a picture is printed through a stable process and the background soil is avoided. As a result, a quality printing is achieved.

(4th Embodiment)

Figure 8:
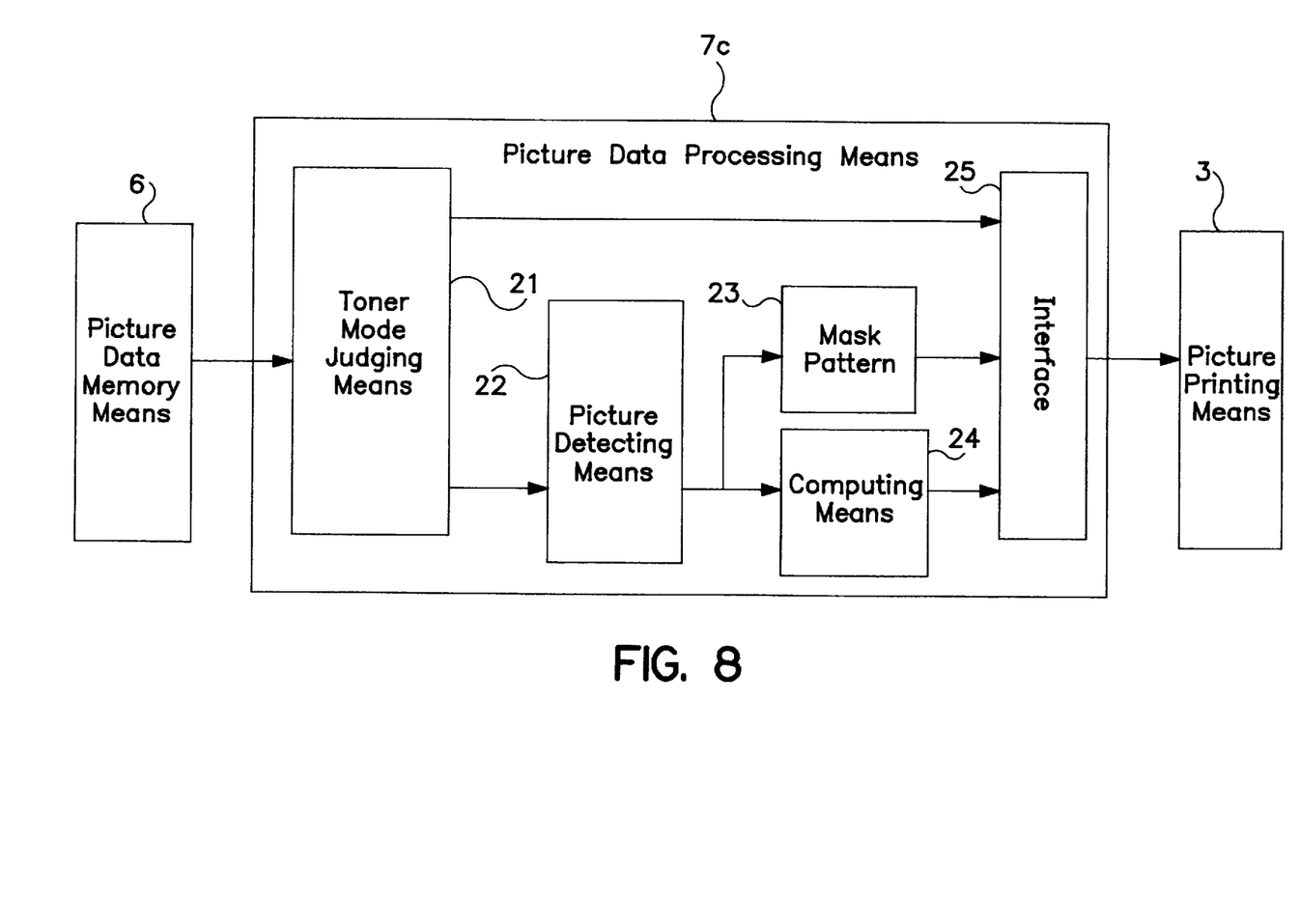
FIG. 8 is a block diagram with a fourth exemplary embodiment of the present invention.
Figure 9:
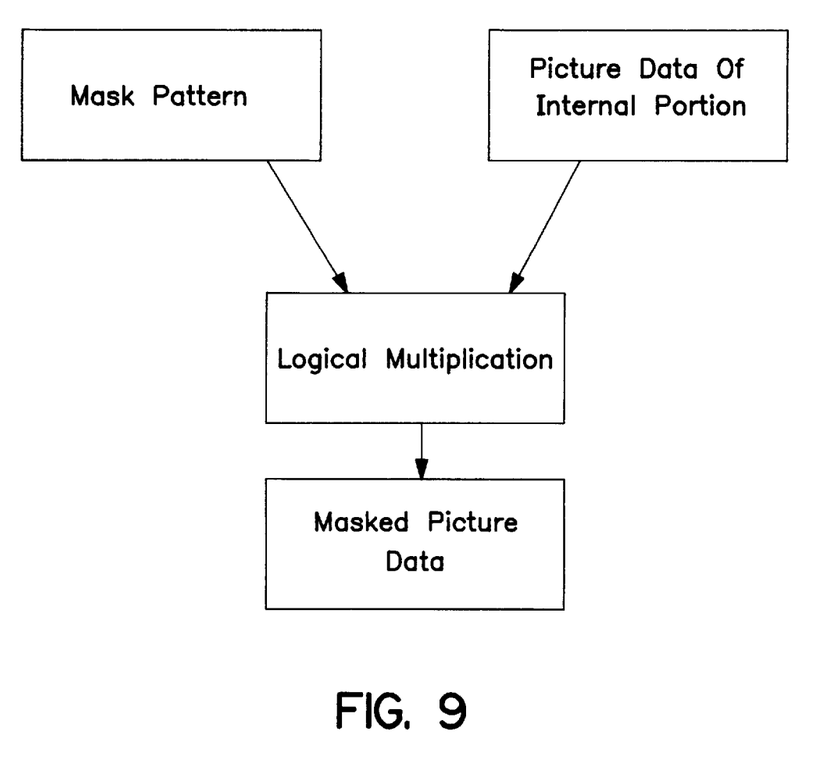
FIG. 9 is a block diagram which further illustrates the fourth exemplary embodiment of the present invention.
Figure 10A:
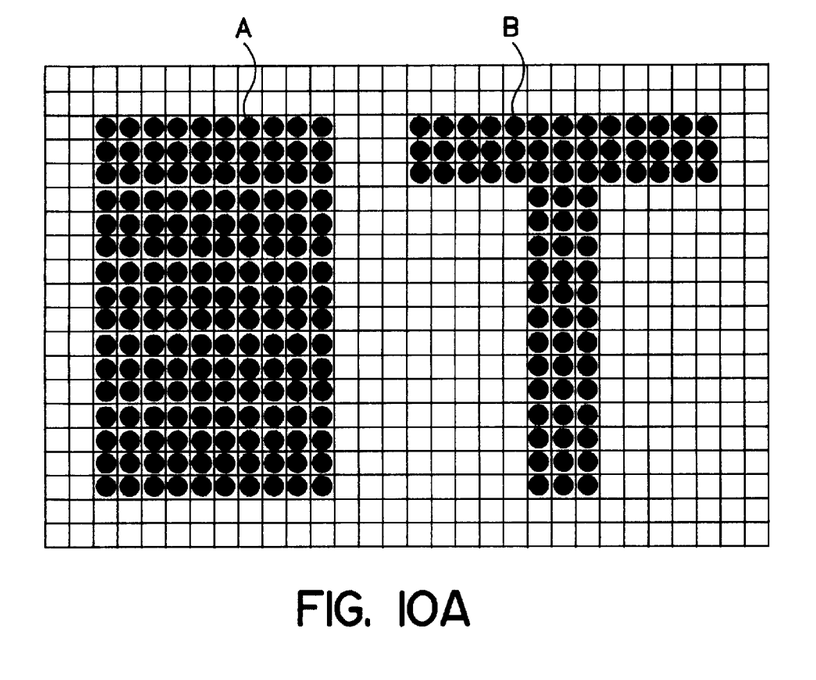
FIGS. 10(a) and (b) illustrate the printing of a picture in accordance with the fourth exemplary embodiment of the present invention.
Figure 10B:
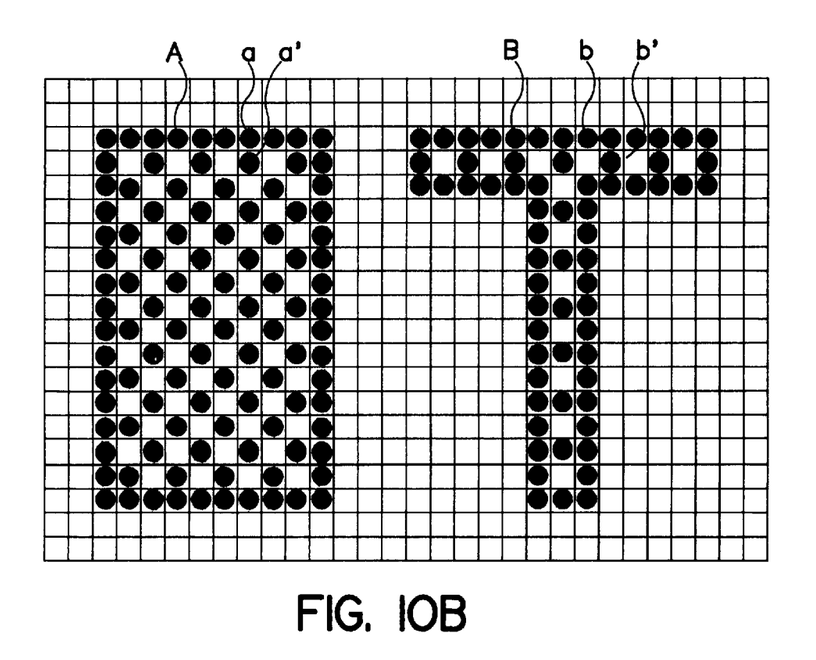

A 4th embodiment is same as the first embodiment except a picture data process means 7c shown in FIG. 8: In the regular mode wherein the toner saving command does not work, a picture data supplied from the picture data memory means 6 is sent without any change to the picture printing means 3, this is the same process as the first embodiment. An interface is numbered 25. FIG. 10 (a) shows a picture of the regular mode. All the dots composing the pictures A and B are of regular sizes. In the toner saving mode wherein the toner saving command works, a picture data is changed into a toner saving picture data by the picture detecting means 22, a mask pattern 23 and computing means 24, and then sent to the picture printing means 3. The picture detecting means 22 groups the picture data into picture data on edge portion and picture data of internal portion. The picture data on edge portion is sent to the picture printing means 3 without any change, while the picture data of internal portion, as shown in FIG. 10, is changed to a masked picture data by logical multiplying with a mask pattern 23 at the computing means 24, and then sent to the picture printing means 3. The mask data 23 has the data corresponding to every dot of internal portion. In this embodiment, the mask pattern is composed with 0 and 1 lined alternately. Toner is thus less consumed. Since outlines are distinct, the pictures A and B can be well distinguished. Further, since a bias voltage on toner is not lowered, printing is stable and back ground soil is avoided. As a result, a quality printing is achieved.

(5th embodiment)

Figure 11:
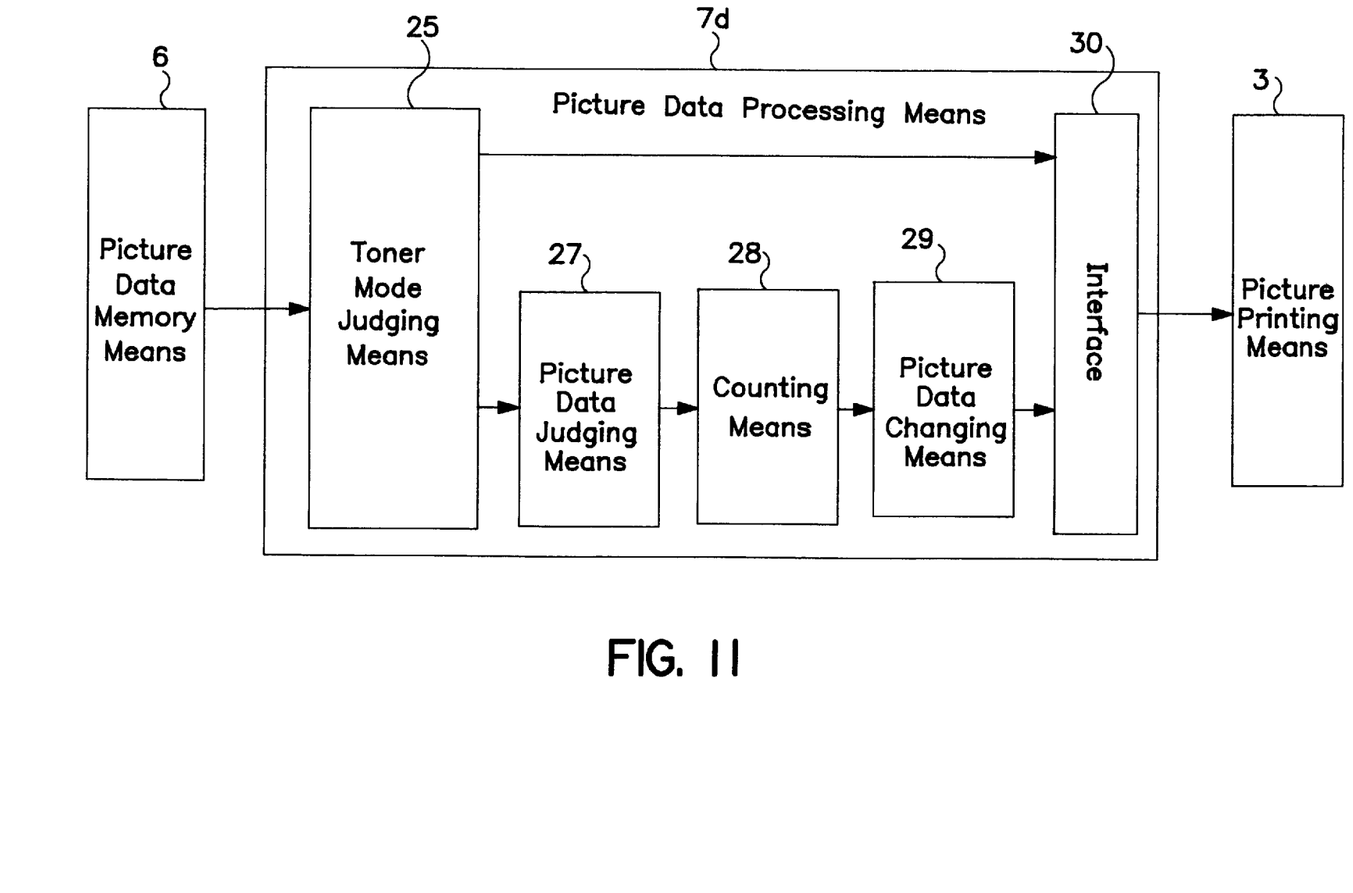
FIG. 11 is a block diagram in accordance with a fifth exemplary embodiment of the present invention.
Figure 12A:
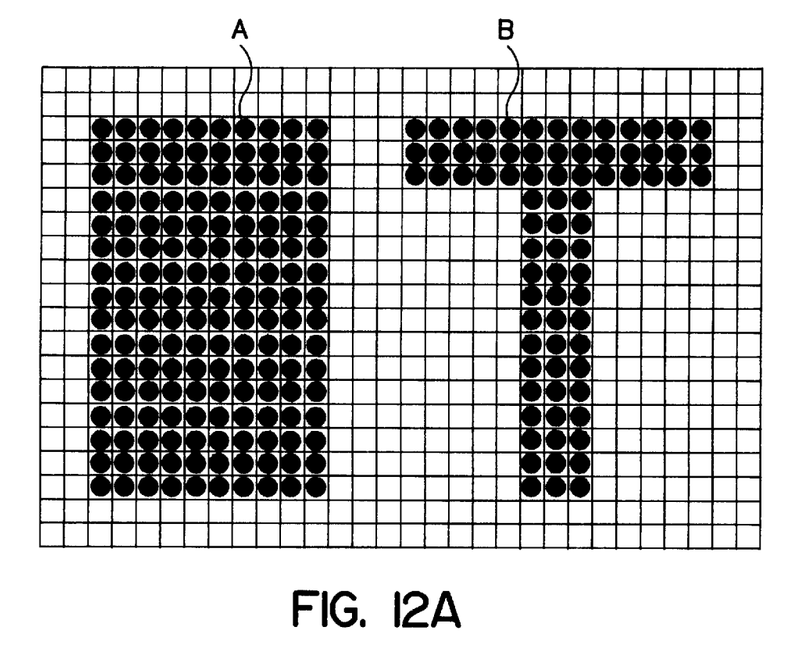
FIGS. 12(a) and (b) illustrate the printing of a picture in accordance with the fifth exemplary embodiment of the present invention.
Figure 12B:
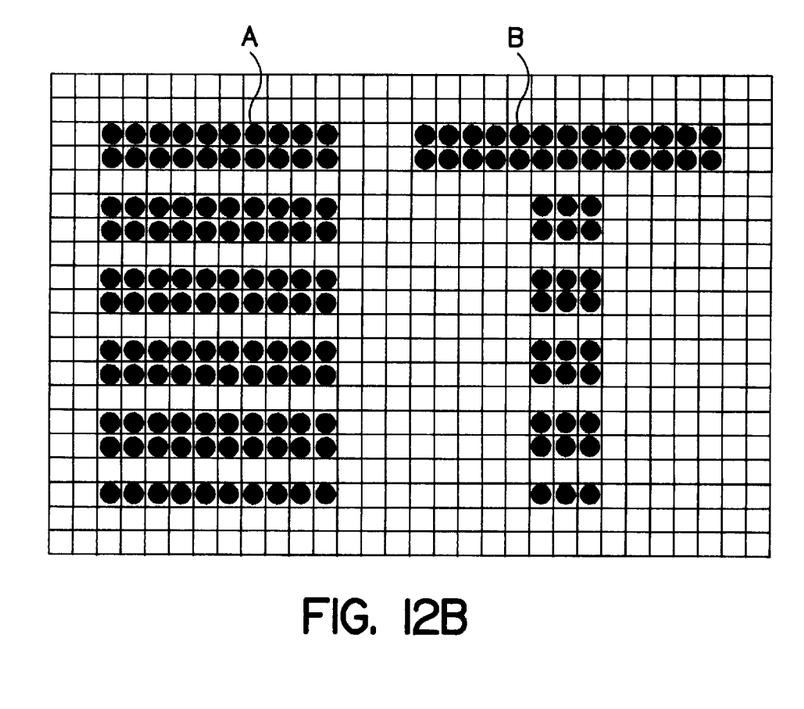

A 5th embodiment is same as the first embodiment except a picture data process means 7d shown in FIG. 11: In the regular mode wherein the toner saving command does not work, a picture data supplied from the picture data memory means 6 is sent without any change to the picture printing means 3, this is the same process as the first embodiment. An interface is numbered 30. FIG. 12 (a) shows a picture in the regular mode. All the dots composing the pictures A and B are of regular sizes. In the toner saving mode wherein the toner saving command works, a picture data is changed into a toner saving picture data by the picture data judging means 27, a counting means 28 and a data changing means 29, and then sent to the picture printing means 3. The picture data judging means 27 judges whether a dot is 1 or 0. When a dot is 1, the counting means 28 counts how many times a picture dot stays 1 continuously. This counter is reset every time a picture dot becomes 0, and restart counting when a picture dot becomes 1 again. The picture data changing means 29 does not change data when the counter counts only 1 or 2. When the counter shows 3, the picture data changing means 29 changes a third "dot=1" to "dot=0" and reset the counter at the same time. FIG. 12 (b) shows a picture of the toner saving mode. This picture is printed downward from top wherein the third "dot=1" is changed to "dot=0". In this embodiment, data is changed as if the picture dots are arranged in a specific pattern, and thereby a rather simple control circuit can be used.

The above mentioned embodiments can be combined, e.g. the embodiment wherein a picture dot size is reduced can be combined with the embodiment wherein a number of picture dots is decreased.

What is claimed:

1. Apparatus for processing image data corresponding to an image to be printed by a printer, wherein said image data corresponds to a plurality of dots which form said image, said apparatus comprising:

receiving means for receiving said image data;

converting means for selectively converting said image data into enhanced image data, said enhanced image data corresponding to a further plurality of dots equal to or less than said plurality of dots, wherein at least ones of said further plurality of dots are smaller than corresponding ones of said plurality of dots, said converting means including:

first changing means for selectively converting an external portion of said image data and second changing means for selectively converting an internal portion of said image data;

wherein said first changing means and said second changing means are coupled to said receiving means to receive respective portions of said image data substantially concurrently; and means for transmitting said enhanced image data to said printer.

2. Apparatus for processing image data according to claim 1, wherein said converting means converts said image data into said enhanced image data by selecting a portion of said image data and comparing the portion with a further adjacent portion of said image data to determine if the portion of said image data is to be converted into said enhanced image data.

3. Apparatus for processing image data according to claim 1, wherein said converting means converts said image data into said enhanced image data by selecting only a portion of said image data and comparing the portion with a further adjacent portion of said image data to determine if the portion of said image data is to be converted into said enhanced image data.

4. Apparatus for processing image data corresponding to an image to be printed by a printer, wherein said image data corresponds to a plurality of dots which form said image, said apparatus comprising:

receiving means for receiving said image data;

internal portion detecting means for detecting an internal portion of said image;

converting means for selectively converting said image data into enhanced image data, said enhanced image data corresponding to said image with ones of said plurality of dots deleted from said internal portion of said image, said converting means including:

first changing means for selectively converting an external portion of said image data and second changing means for selectively converting an internal portion of said image data;

wherein said first changing means and said second changing means are coupled to said receiving means to receive respective portions of said image data substantially concurrently; and means for transmitting said enhanced image data to said printer.

5. Apparatus for processing image data corresponding to an image to be printed by a printer, wherein said image data corresponds to a plurality of dots which form said image, said apparatus comprising:

receiving means for receiving said image data;

internal portion detecting means for detecting an internal portion of said image;

converting means for selectively converting said image data into enhanced image data, said enhanced image data corresponding to said image with ones of said plurality of dots from said internal portion of said image replaced with a further plurality of dots which are in a predetermined pattern, said converting means including:

first changing means for selectively converting an external portion of said image data and second changing means for selectively converting an internal portion of said image data;

wherein said first changing means and said second changing means are coupled to said receiving means to receive respective portions of said image data substantially concurrently; and means for transmitting said enhanced image data to said printer.

6. Apparatus for processing image data corresponding to an image to be printed by a printer, wherein said image data corresponds to a plurality of dots which form said image, said apparatus comprising:

receiving means for receiving said image data;

detecting means for detecting an internal portion and an external portion of said image;

converting means for selectively converting said image data into enhanced image data, said enhanced image data corresponding to a further plurality of dots, said converting means including:

first changing means for selectively converting an external portion of said image data and second changing means for selectively converting an internal portion of said image data;

wherein said first changing means and said second changing means are coupled to said receiving means to receive respective portions of said image data substantially concurrently, wherein ones of said further plurality of dots corresponding to said external portion of said image includes smaller dots than said corresponding ones of said plurality of dots and ones of said further plurality of dots corresponding to said internal portion of said image includes further smaller dots than that of said external portion; and means for transmitting said enhanced image data to said printer.

7. Apparatus for processing image data according to claim 6, wherein said converting means converts said image data into said enhanced image data by selecting a portion of said image data and comparing the portion with a further adjacent portion of said image data to determine if the portion of said image data is to be converted into said enhanced image data.

8. Apparatus for processing image data according to claim 6, wherein said converting means converts said image data into said enhanced image data by selecting only a portion of said image data and comparing the portion with a further adjacent portion of said image data to determine if the portion of said image data is to be converted into said enhanced image data.

* * * * *